(12) United States Patent
Kamon

(10) Patent No.: US 7,363,207 B2
(45) Date of Patent: Apr. 22, 2008

(54) SIMULATOR FOR A CHEMICAL MECHANICAL POLISHING

(75) Inventor: Kazuya Kamon, Tokyo (JP)

(73) Assignee: Renesas Technology Corp., Chiyoda-Ku, Tokyo (JP)

( * ) Notice: Subject to any disclaimer, the term of this patent is extended or adjusted under 35 U.S.C. 154(b) by 542 days.

(21) Appl. No.: 10/630,775

(22) Filed: Jul. 31, 2003

(65) Prior Publication Data

US 2004/0167755 A1 Aug. 26, 2004

(30) Foreign Application Priority Data

Feb. 25, 2003 (JP) ............................ P2003-047078

(51) Int. Cl.
*G06F 17/50* (2006.01)
(52) U.S. Cl. .......................................... 703/13; 716/21
(58) Field of Classification Search .................. 703/13
See application file for complete search history.

(56) References Cited

U.S. PATENT DOCUMENTS

| | | | | |
|---|---|---|---|---|
| 6,484,300 | B1 * | 11/2002 | Kim et al. ....................... | 716/7 |
| 6,623,993 | B2 | 9/2003 | Perrin et al. | |
| 6,711,732 | B1 * | 3/2004 | Dai et al. ........................ | 716/19 |
| 6,965,809 | B2 * | 11/2005 | Dickenscheid et al. ...... | 700/117 |
| 6,988,060 | B1 * | 1/2006 | Coon et al. .................... | 703/13 |
| 2002/0161534 | A1 * | 10/2002 | Adler et al. ................... | 702/35 |
| 2003/0022596 | A1 | 1/2003 | Meyer | |
| 2003/0103189 | A1 * | 6/2003 | Neureuther et al. ......... | 351/176 |
| 2003/0207576 | A1 * | 11/2003 | Ohtake et al. ............... | 438/691 |
| 2004/0005769 | A1 * | 1/2004 | Mikolas ....................... | 438/612 |
| 2004/0248411 | A1 * | 12/2004 | Ushio et al. ................. | 438/689 |

FOREIGN PATENT DOCUMENTS

| | | |
|---|---|---|
| DE | 100 65 380 A1 | 12/2000 |
| JP | 10-247206 | 9/1998 |

(Continued)

OTHER PUBLICATIONS

"Innovation of ULSI lithography technique,." Science Forum Inc., Nov. 10, 1994, pp. 71-86. Extract of relevance.

(Continued)

*Primary Examiner*—Paul Rodriguez
*Assistant Examiner*—Andre Pierre-Louis
(74) *Attorney, Agent, or Firm*—Buchanan Ingersoll & Rooney PC

(57) ABSTRACT

A simulator is provided which can simulate in consideration of various parameters in a CMP process. A pattern density two-dimensional distribution calculating part takes a pattern density two-dimensional distribution image. A mesh adjusting part performs a mesh adjustment of a measured data. A height distribution calculating part calculates a height distribution based on the pattern density two-dimensional distribution image. A correlation coefficient calculating part calculates a correlation coefficient by performing a least squares analysis of a measured data and a height distribution data. Passing through a Fourier calculation part, spatial filter part, and reverse Fourier calculating part, the pattern density two-dimensional distribution image becomes a pattern density two-dimensional distribution image. This distribution image further passes through a height distribution calculating part, resulting in a height distribution data. The correlation coefficient calculating part calculates a correlation coefficient by performing a least squares analysis of the height distribution data and measured data after CMP process.

9 Claims, 12 Drawing Sheets

FOREIGN PATENT DOCUMENTS

WO     WO 99/25520     5/1999

OTHER PUBLICATIONS

German Patent & Trademark Office. Office Action dated Oct. 20, 2005. German Application No. 103 45 194.3-33. Applicant—Renesas Technology Corp. English Translation (4 pages).

German Patent & Trademark Office. Office Action dated Oct. 20, 2005. German Application No. 103 45 194.3-33. Applicant—Renesas Technology Corp. German Language (4 pages).

Chinese Office Action dated Mar. 10, 2006 with English-Language Translation.

\* cited by examiner

F I G . 2
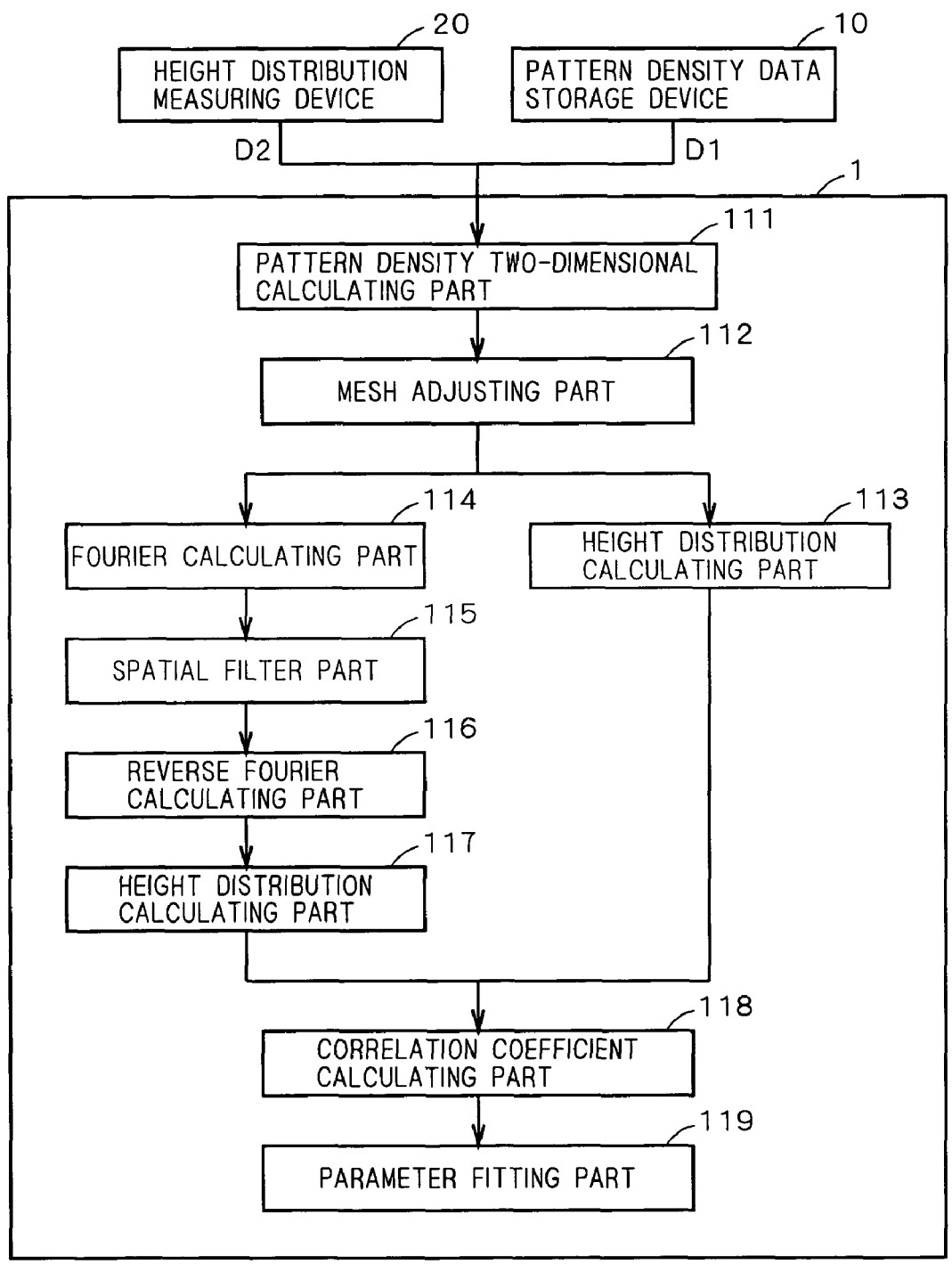

REAL SPACE

ADD MESHES AND PROVIDE "0"

F FOURIER SPACE

REAL SPACE

SIMULATOR FOR A CHEMICAL MECHANICAL POLISHING

BACKGROUND OF THE INVENTION

1. Field of the Invention

The present invention relates to a simulator, and more particularly to a simulator for a chemical mechanical polishing (CMP) process used in the manufacture of semiconductor devices.

2. Description of the Background Art

The miniaturization and high integration of large scale integrated circuits (LSIs) creates the tendency that circuit patterns formed on the LSIs have a minimum pattern dimension of 0.1 μm. A circuit pattern of an LSI can be formed in a manner that writes a design circuit on a transfer mask for implementing it on a semiconductor substrate by laser or electron beam, and then performs a batch optical transfer of the transfer mask pattern onto the semiconductor substrate by a projection transfer apparatus.

The resolution R of the transfer apparatus is given by the following expression:

$$R = k1 \lambda / NA$$

where k1 represents a process constant, λ represents a waveform, and NA represents a numerical aperture.

The circuit pattern is formed by the optical transfer method as described above, and a transfer in a defocus state produces a blurred image, resulting in poor image forming performance. Here, the extent of focus to which a predetermined image forming performance can be maintained is referred to as "depth of focus (DOE)" and is given by the following expression:

$$DOF = k2 \lambda / NA^2$$

where k2 represents a process factor.

In the present condition that the fabrication dimension approaches 0.1 μm, the depth of focus that can be ensured optical theoretically is only about 0.3 μm.

On the other hand, repetitive processes such as selective etching and film formation are executed on the semiconductor substrate, and irregularities (substrate irregularities) occur on the surface of the semiconductor substrate.

The occurrence of substrate irregularities was not a serious problem in such semiconductor devices in which the integration degree is low and substrate irregularities are smaller than the depth of focus. However, as the fabrication dimension is smaller, the substrate irregularities have recently become larger than the depth of focus, making it difficult to obtain a predetermined image forming performance.

The substrate irregularities can be eliminated by for example the following methods: one in which some dummy patterns irrelevant to a real circuit pattern are properly disposed to increase the bulk of lower portions (i.e., dummy pattern method); and another in which a semiconductor substrate is planarized by polishing so as to cut the irregularities generated thereon by chemical mechanical polishing (CMP).

A general description of the planarization technique by CMP process is contained in, for example, "ULSI Lithography Technical Innovation," pp71-86, issued Nov. 10, 1994 by Science Forum Corp.

With the miniaturization and high integration of LSIs as stated above, a CMP process becomes increasingly critical. To effectively execute the CMP process, there is need for simulation in consideration of various parameters. However, heretofore there is no effective simulator.

SUMMARY OF THE INVENTION

It is an object of the present invention to provide a simulator that can execute simulations in consideration of various parameters in a CMP process.

The present invention is intended for a simulator for a chemical mechanical polishing process for planarizing a semiconductor substrate. The simulator receives a pattern density data containing information about a pattern density per unit region of a fabrication pattern in a pattern forming process of a semiconductor device, and first and second measured data about height distributions of irregularities on the semiconductor substrate that are measured before and after a chemical mechanical polishing process executed with respect to the pattern forming process. The first measured data is compared with a first calculated data about a two-dimensional distribution of irregularities on the semiconductor substrate before the chemical mechanical polishing process, which is calculated from the pattern density data. A least squares analysis is performed to obtain a first correlation coefficient, and a parameter fitting is performed such that square of the first correlation coefficient becomes a maximum. Also, the second measured data is compared with a second calculation data about a two-dimensional distribution of irregularities on the semiconductor substrate after the chemical mechanical polishing process, which is calculated from the pattern density data. A least squares analysis is performed to obtain a second correlation coefficient, and a parameter fitting is performed such that square of the second correlation coefficient becomes a maximum.

One parameter fitting is accomplished by comparing the first calculated data about the two-dimensional distribution of irregularities on the semiconductor substrate before chemical mechanical polishing process with the first measured data about the height distribution of irregularities on the semiconductor substrate before chemical mechanical polishing process. Another parameter fitting is accomplished by comparing the second calculated data about the two-dimensional distribution of irregularities on the semiconductor substrate after chemical mechanical polishing process with the second measured data after chemical mechanical polishing process. Therefore, the adjustment of parameters before chemical mechanical polishing process can be separated clearly from the adjustment of parameters after chemical mechanical polishing process, thus leading to the simulator that can consider various parameters. This provides the advantage that if process conditions is changed or a new apparatus is added, adjustment may be accomplished merely by making a fine adjustment of parameters.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram to explain the configuration of a simulator for a CMP process in the first preferred embodiment;

DESCRIPTION OF THE PREFERRED EMBODIMENTS

Technical Idea of the Present Invention

Figure 1:
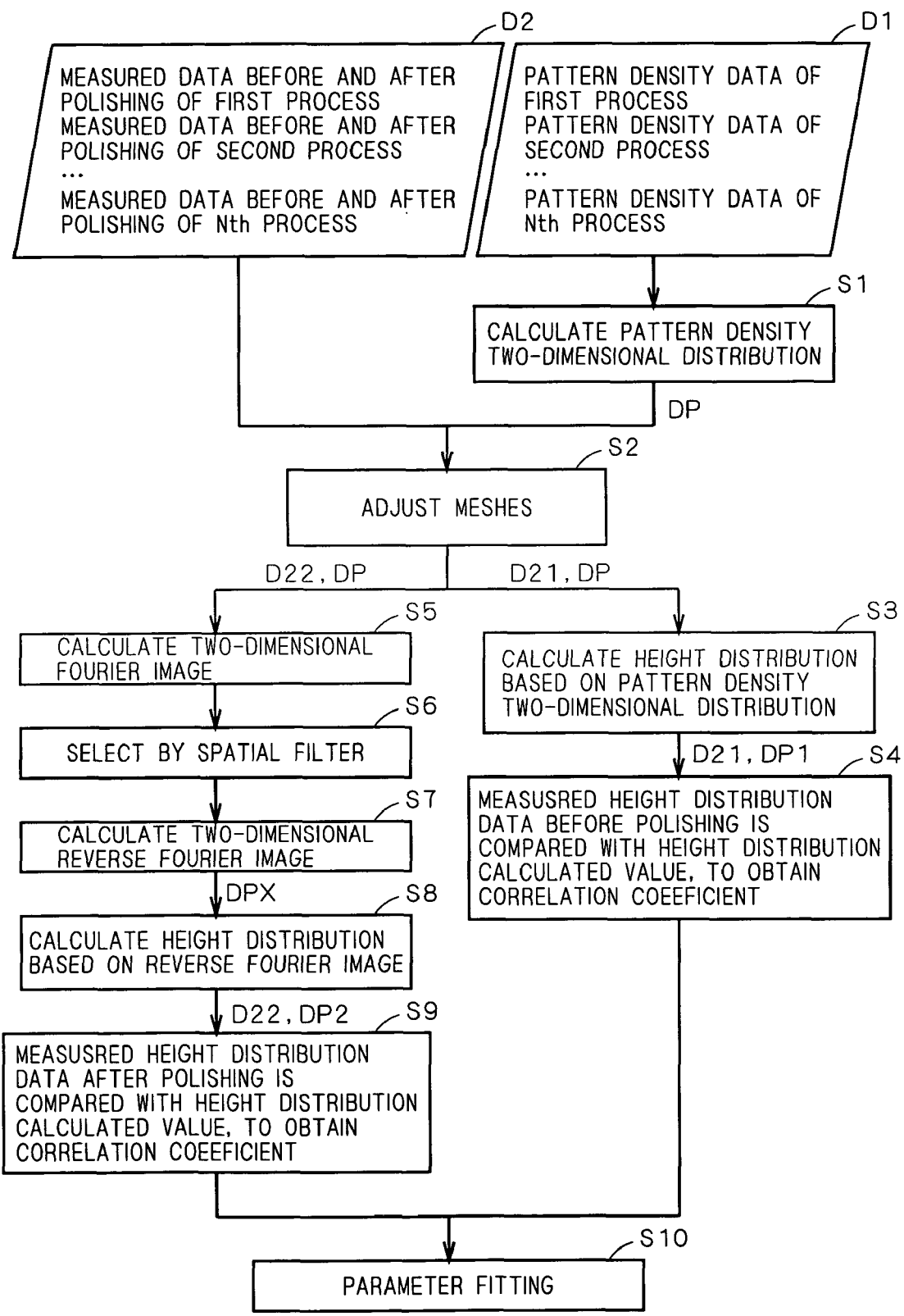
FIG. 1 is a flowchart to explain a method for simulating a CMP process according to a first preferred embodiment of the present invention.

When manufacturing large scale integrated circuits (LSIs), a plurality of LSIs called "sub-chips," including a TEG (test element group) and a process monitor, are also formed on a semiconductor substrate in addition to a target LSI called "main chip." The plurality of sub-chips are formed in a region other than a region for forming the main chip.

Not only a circuit pattern of the main chip but also circuit patterns of the plurality of sub-chips are formed in a transfer mask used in the individual processes for forming the main chip and sub-chips on the semiconductor substrate.

To form the transfer mask, it is possible to use in the state that design data of the main chip and sub-chips are already synthesized. However, it is preferably split and processed because the actual LSI design data is tremendous. Therefore, the design data are often split in units of sub-chips and the split data are used sequentially.

Splitting design data in units of sub-chips facilitates the handling of a tremendous amount of design data. The present inventor has reached a technical idea that the handling of design data can be further facilitated by converting the design data in units of sub-chips to pattern density data of a small scale.

Preferred embodiments of a simulation method and simulator for a CMP process based on the above technical idea will be described below.

In the following description, pattern density data is to be defined as follows.

A pattern graphic is determined by design data of a semiconductor device. The pattern density is the percentage of the area of graphic components, i.e., pattern components, contained in a unit region of the pattern graphic. For example, if pattern components occupy one-half of the unit region that is a rectangular region of 100 μm square, the pattern density is 50%.

As used herein, the term "unit region" denotes a rectangular region corresponding to a one-mesh region for obtaining a pattern density two-dimensional distribution data. By an AND logic with the one-mesh region, an AND operation with the mesh region is executed so that the area of a pattern component is calculated to obtain its pattern density. Thus, the pattern density obtained per one-mesh region is pattern density data.

To the whole area of an individual sub-chip, such calculation for each of the processes is made to obtain a pattern density data related to a respective process of the individual sub-chip.

The following first to fourth preferred embodiments premise that a simulation of a CMP process is performed with the use of pattern density data per process, as described above.

The simulator according to the present invention can be implemented by a computer system, and its software can be created with the use of an algorithm of the simulation method according to the present invention.

A. First Preferred Embodiment

A description will be made of a simulation method and simulator for a CMP process according to a first preferred embodiment of the present invention.

A-1. Simulation Method and Simulator for CMP process

A method for simulating a CMP process will be described by referring to the configuration of a simulator for a CMP process 1 shown in FIG. 2, and by using the flowchart shown in FIG. 1.

Referring to FIG. 2, the simulator for a CMP process 1 receives a pattern density data D1 per process from a pattern density data storage device 10, and receives a measured data D2 about height distributions before and after CMP per process from a height distribution measuring device 20.

The height distribution measuring device 20 can be implemented by using, for example, an auto focus function of an exposure device used in the manufacture of semiconductor devices.

That is, the exposure device has the function of irradiating obliquely laser light to a semiconductor substrate and observing its reflected light to measure the height of the substrate. The use of this function enables to take a two-dimensional distribution of the height of a fabricated pattern that is formed on a semiconductor substrate.

Note that examples of the height distribution measuring device 20 should not be limited to the auto focus function of an exposure device. For example, an atomic force microscopy (AFM) may be used.

As previously described, in the manufacturing processes of semiconductor devices, the processing such as selective etching and film formation is performed repetitively on a semiconductor substrate, so that in every process, irregularities occur on the surface of the semiconductor substrate. One technique of eliminating such substrate irregularities is a CMP process. Therefore, a CMP process is executed every time one process is performed.

The height distribution of irregularities on the semiconductor device differs before and after performing a CMP process. The height distribution measuring device 20 measures a height distribution of irregularities on the semiconductor device before performing a CMP process and then performing a CMP process, and provides the measured data to the simulator 1.

In the simulator 1, based on a coordinate data contained in a pattern density data D1, a pattern density two-dimensional distribution calculating part 111 expands the pattern density data such that a mesh data is arrayed in two dimensions to obtain a two-dimensional image. This provides a pattern density two-dimensional distribution image DP per process (step S1).

The height distribution measuring device 20 provides a measured data D2 about the height distribution of irregularities on a semiconductor substrate before and after performing a CMP process. The measured data D2 is given as a two-dimensional distribution image of the condition of the irregularities on the semiconductor substrate. The mesh of the pattern density two-dimensional distribution image DP is not always identical with that of the height distribution measured data D2. In order to adjust such that the distribution image DP and measured data D2 have the same mesh, a mesh adjusting part 112 makes a mesh adjustment (step S2).

The operation of mesh adjustment performed in the mesh adjusting part 112 will be described by using FIGS. 3A, 3B, 3C, and FIG. 4.

Figure 3B:
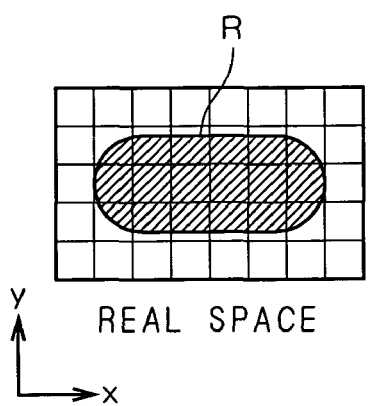
FIGS. 3A to 3C are conceptual diagrams to explain a mesh adjusting operation.
Figure 3A:
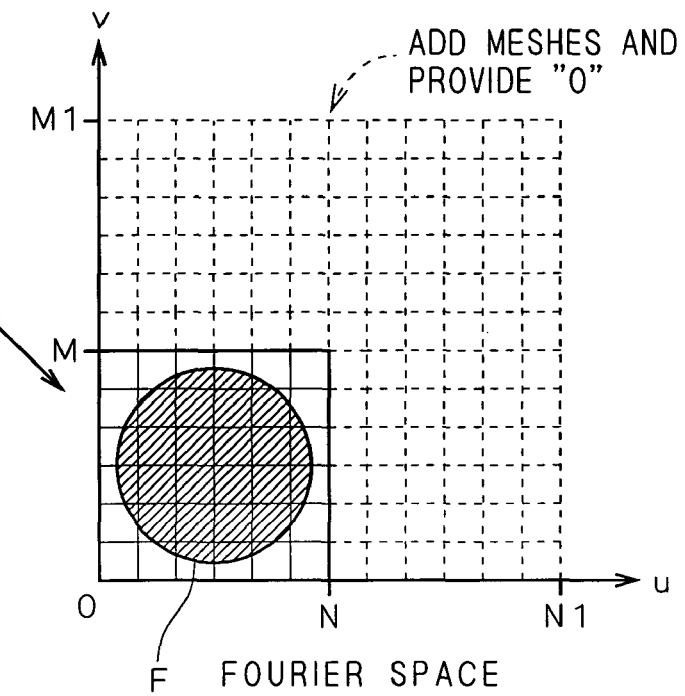
Figure 3C:
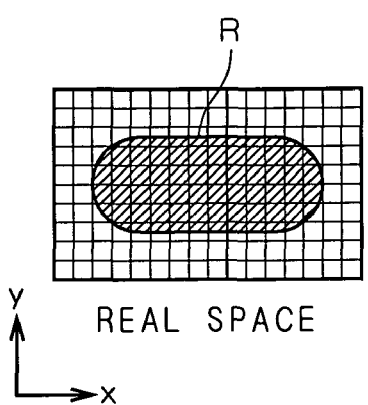

FIGS. 3A to 3C are diagrams illustrating schematically the processing in the mesh adjusting part 112.

A Fourier image F in a Fourier space shown in FIG. 3A is subjected to a reverse Fourier transform to obtain a reverse Fourier image R in a real space shown in FIG. 3B. If a certain mesh is added into the Fourier space as indicated by the broken line in FIG. 3A and then a value of zero is added to the image data on the added mesh, as shown in FIG. 3C, the resultant reverse Fourier image R has a higher density than the image of FIG. 3B.

For example, if new meshes are added on a Fourier space in order to increase the number of meshes to $2^m \times 2^n$ times meshes in two dimensions, a reverse Fourier transform to a real space causes an up sampling to $2^m \times 2^n$ times meshes in two dimensions. The increasing rate of the number of meshes can usually be set to any desired value. It is preferable to set to a rate, such as $2^m \times 2^n$ times, at which it is possible to use FFT.

The mesh adjusting part 112 executes the operation of mesh adjustment by using such mesh interpolation.

Figure 4:
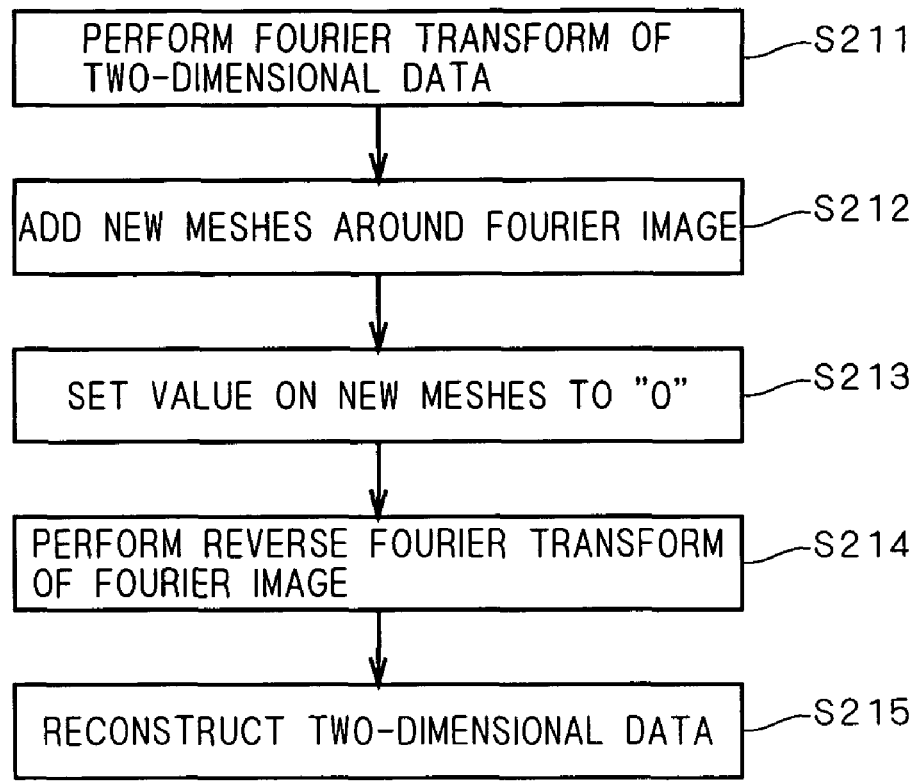
FIG. 4 is a flowchart to explain a mesh adjusting operation.

More specifically, as shown in FIG. 4, the mesh adjusting part 112 performs a Fourier transform of the pattern density two-dimensional distribution image DP provided from the pattern density two-dimensional distribution calculating part 111 and the height distribution measured data D2 provided from the height distribution measuring device 20 (step S211).

This provides their respective Fourier images in the Fourier space, as described with reference to FIG. 3A. At this time, the respective number of meshes and size of meshes are found and the Fourier image having a lesser number of meshes is adjusted to that having a greater number of meshes.

In general, the measured data D2 has a lesser number of meshes. Therefore, a mesh interpolation is performed such that the number of meshes in the measured data D2 is adjusted to that in the pattern density two-dimensional distribution image DP.

That is, new meshes are added around the Fourier image in the measured data D2 (step S212).

The values on the new meshes are then set to "0" in step S213.

Subsequently, the Fourier image is subjected to a reverse Fourier transform (step S214), to obtain a reverse Fourier image, and the measured data D2 after the mesh adjustment and pattern density two-dimensional distribution image DP are reconstructed (step S215).

Through the foregoing adjustment operation, the mesh of the pattern density two-dimensional distribution image DP matches the mesh of the height distribution measured data D2, and these two data can be compared to each other.

Returning to FIGS. 1 and 2, when the mesh adjustment completes in step S2, if the measured data after mesh adjustment is measured data before CMP process (i.e., before polishing), it is provided as a measured data D21 to a height distribution calculating part 113, together with the pattern density two-dimensional distribution image DP. If the measured data after mesh adjustment is measured data after the CMP process (after polishing), it is provided as a measured data D22 to a Fourier calculating part 114, together with the pattern density two-dimensional distribution image DP.

The height distribution calculating part 113 calculates a height distribution based on the pattern density two-dimensional distribution image DP, to obtain a height distribution data DP1 about a fabrication object surface before CMP process (step S3).

Figure 5:
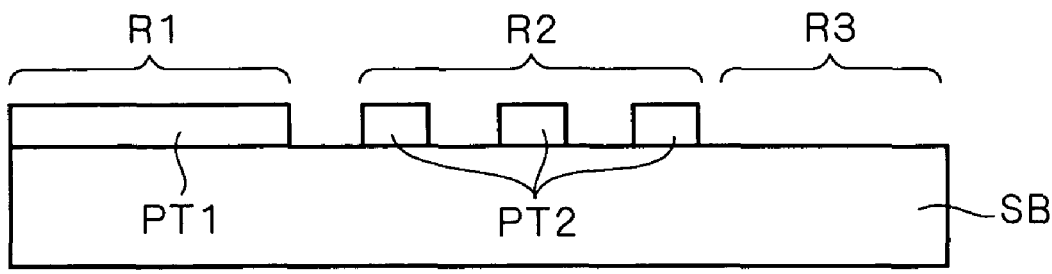
FIGS. 5 and 6 are diagrams illustrating schematically the relationship between pattern density and height of irregularities of a fabrication object surface.
Figure 6:
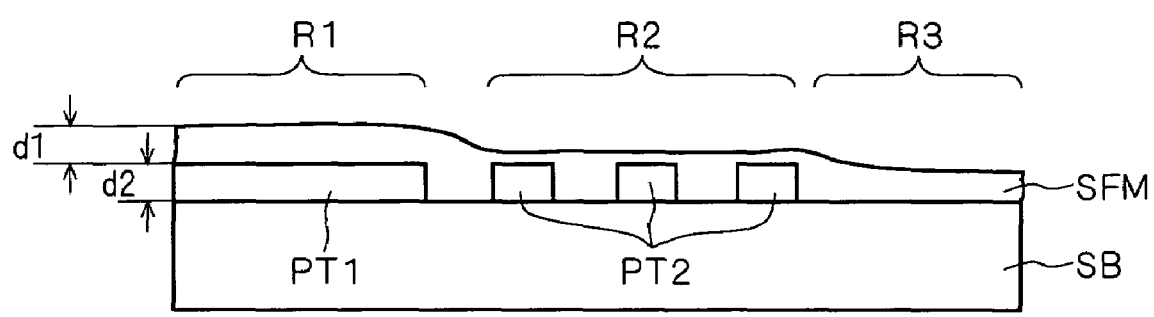

Here, a method for calculating a height distribution based on a pattern density two-dimensional distribution image DP will be schematically explained by using FIGS. 5 and 6.

FIG. 5 shows a state that an already fabricated circuit pattern PT1 and plurality of circuit patterns PT2 are arrayed on a semiconductor substrate SB. In FIG. 5, region R1 represents the region where the circuit pattern PT1 is disposed; region R2 represents the region where the plurality of circuit patterns PT2 are disposed; and region R3 represents the region where no circuit pattern is disposed.

In region R1, the circuit pattern PT1 is formed so as to cover the entire region and its pattern density is 100%. In region R2, 50% of its entire region is covered with the circuit patterns PT2, and its pattern density is 50%. The pattern density of region R3 is 0%.

In the manufacturing processes of LSIs, the process of forming an insulating film and metal film and the process of patterning these films are repetitively performed. Therefore, the insulating film or metal film (hereinafter referred to as a "laminated film") is to be formed on an already fabricated circuit pattern. When forming a laminated film, the material of the laminated film per unit area is supplied nearly uniformly throughout the entire semiconductor substrate surface.

FIG. 6 shows a state that a laminated film SFM is formed on the semiconductor substrate SB, and there occurs a height distribution in the laminated film SFM due to a difference in pattern density between the circuit patterns.

Let, d1 is the formation thickness of the laminated film SFM, and d2 is the thickness of the circuit pattern PT1 or PT2. In region R1 having a pattern density of 100%, the total height H1 of the laminated film SFM and circuit pattern PT1 is given by the following expression: $H1=d1+d2\times1.0$. In region R2 having a pattern density of 50%, reflow and annealing processing fill grooves to facilitate planarization (the planarization effect during the film formation), so that the total height H2 of the laminated film SFM and circuit pattern PT2 is given by the following expression: $H2=d1+d2\times0.5$. In region R3 having a pattern density of 0%, the total height H3 of the laminated film SFM and circuit pattern PT2 is given by the following expression: $H3=d1+d2\times0$. In the above three expressions, the factors "1.0", "0.5", and "0" are pattern densities.

Since the formation thickness d1 of the laminated film SFM is common to all the regions, it is relatively meaningless and can be eliminated. Accordingly, the height of each region can be given by the expression: d2×(pattern density).

The thickness d2 of the circuit pattern PT1 or PT2 is a process parameter that varies depending on the type of the pattern.

Therefore, the height distribution calculating part 113 can obtain a height distribution of the fabrication object surface before CMP process in such a simple arithmetic of multiplying the pattern density two-dimensional distribution image DP by the thickness of a laminated film to be formed in the following next process.

Returning to FIGS. 1 and 2, first, the operation of parameter fitting before CMP process will be described.

After taking the height distribution data DP1 about the fabrication object surface before CMP process in step S3, the measured data before CMP process D21 and height distribution data DP1 are provided to a correlation coefficient calculating part 118.

In the correlation coefficient calculating part 118, the measured data D21 and height distribution data DP1 are subjected to a least squares analysis to calculate a correlation coefficient (step S4).

As used herein, the term "least squares analysis" refers to the following technique that two height distribution data are compared to each other and their similarity is analyzed by least squares method.

Following is a brief description of the lease squares method. In data x and data y, their respective sample variances are expressed by the following equation (1) and equation (2), respectively.

$$S_x^2 = \frac{\Sigma(x - \bar{x})^2}{n} \quad (1)$$

$$S_y^2 = \frac{\Sigma(y - \bar{y})^2}{n} \quad (2)$$

The sample covariance can be expressed by the following equation (3):

$$Sxy = \frac{\Sigma(x - \bar{x})(y - \bar{y})}{n} \quad (3)$$

In the above equations (1) to (3), $\bar{x}$ and $\bar{y}$ represent a mean value of data x and data y, respectively, and n represents the number of data.

A correlation coefficient r given by the following equation (4) can be defined from the above-mentioned sample variances and sample covariance.

$$r = \frac{Sxy}{SxSy} \quad (4)$$

The correlation coefficient calculated in step S4 has a value from −1 to 1. For a positive correlation, "1" represents a complete match. For a negative correlation, "−1" represents a complete match. Accordingly, it can be said that in the positive and negative correlations, a larger square value increases the degree of match between data x and data y, namely between the height distribution in the measured data X21 and the height distribution in the distribution data DP1.

The maximum square of correlation coefficient indicates that the former height distribution is approximately the same as the latter.

Using the value of the square of correlation coefficient as an index, a parameter fitting part 119 performs a parameter fitting such that the square of correlation coefficient approaches the maximum (step S10).

Concretely, when forming a film on a semiconductor substrate (a fabrication object surface) having a certain pattern, the thickness of the film formed is a fitting parameter. There is of course other fitting parameters than the thickness of a laminated film.

Here, a height distribution after forming the above film on the semiconductor substrate is measured by the height distribution measuring device 20, and the measured result is measured data D21. A calculated value based on a pattern density data when forming the above film is height distribution data DP1 about the fabrication object surface before CMP process.

Therefore, the formation thickness d2 of the laminated film SFM that was set in step S3 is changed so as to approach the measured data D21, i.e., increase the correlation coefficient. This is one of the parameter fittings before CMP process.

Following is the operation of parameter fitting after CMP process.

The pattern density two-dimensional distribution image DP that is provided to the Fourier calculating part 114 is then subjected to a Fourier transform, to obtain a two-dimensional Fourier image. This Fourier transform causes a projection from a real space to a frequency space, so that a two-dimensional image in the real space is transformed to a two-dimensional Fourier image represented by the magnitude of space frequencies (step S5).

Here, a component having a small space frequency corresponds to a region in the real space where many isolated patterns are present, and a component having a large space frequency corresponds to a region in the real space where many dense patterns are present.

Subsequently, in a spatial filter part 115, the two-dimensional Fourier image is subjected to a spatial filter that permits only passage of components having a small space frequency. As the result, the components of small space frequency are selected and components of large space frequency are removed (step S6). The technique of spatial filter is well known.

Here, the component having a small space frequency corresponds to a component that is a factor contributing to the phenomenon having a long correlation distance. The component having a long space frequency corresponds to a component that is a factor contributing to the phenomenon having a short correlation distance.

Therefore, the spatial filter removes the components of large space frequency, leaving the components of small space frequency, i.e., the components that are the factors contributing to the phenomenon having a long correlation distance.

When patterns of the same size exist in different densities in a CMP process, there occurs such a phenomenon that its polish velocity differs depending on the location. This phenomenon has an extremely long correlation distance, as long as 10 μm to 100 μm, in some cases.

Subsequently, a reverse Fourier calculating part 116 performs a reverse Fourier transform of the two-dimensional Fourier image holding only the components of small spatial frequency, thereby obtaining a reverse Fourier image, i.e., a pattern density two-dimensional distribution image DPX in the real space (step S7).

This pattern density two-dimensional distribution image DPX indicates only the components that are the factor contributing to the phenomenon having a long correlation distance. This is a two-dimensional distribution image suitable for analyzing the phenomenon having a long correlation distance.

The above-mentioned two-dimensional distribution image DPX and measured data after CMP process D22 are then provided to the height distribution calculating part 117. Based on the pattern density two-dimensional distribution image DPX, the height distribution calculating part 117 calculates a height distribution to obtain a height distribution data DP2 containing only factors that can cause the phenomenon having a long correlation distance (step S8).

This height distribution calculation method need not be described herein because it is the same as the method for calculating the height distribution based on the pattern density two-dimensional distribution image DP, which is described previously with reference to FIGS. 5 and 6.

After the height distribution data DP2 is obtained in step S8, the data DP2 and measured data after CMP process D22 are provided to a correlation coefficient calculating part 118.

The correlation coefficient calculating part 118 performs a least squares analysis of the measured data D22 and height distribution data DP2 to calculate a correlation coefficient (step S9). The operation of step S9 need not be described herein because it is the same as the analysis operation in step S4.

Using the correlation coefficient obtained in step S9, as an index, the parameter fitting part 119 performs a parameter fitting such that the square of the correlation coefficient approaches the maximum (step S10).

Here, assuming that a film is formed on a semiconductor substrate (a fabrication object surface) having a certain pattern, the height distribution measuring device 20 measures a height distribution at the stage where this film is already polished by CMP. The measured result is measured data D22. On the other hand, a height distribution obtained based on the two-dimensional distribution image indicating only the components that can cause the phenomenon having a long correlation distance is height distribution data DP2.

Therefore, the formation thickness d2 of the laminated film SFM that was set in step S8 is changed so as to approach the measured data D22, i.e., increase the correlation coefficient. This is one of the parameter fittings after CMP process.

For example, the use of a two-dimensional distribution data after being subjected to a Fourier analysis enables to consider elastic deformation before a polishing is started with a polishing pad of CMP pressed against irregularities of a semiconductor substrate. This permits an analysis free from any influence on parameters such as polishing time and the number of revolutions of the polishing pad.

The foregoing operations in steps S1 to S10 are repeated with respect to measured data before and after CMP process in all the inputted manufacturing processes.

A-2. Effects

According to the method for simulating a CMP process and the simulator for a CMP process in the first preferred embodiment, before and after CMP process, a measured data and a simulation data are compared to obtain a correlation. Therefore, the adjustment of parameters before CMP process can be separated clearly from the adjustment of parameters after the CMP process, thus leading to a simulator that can consider various parameters.

This provides the characteristic feature that if process conditions are changed or a new apparatus is added, adjustment may be accomplished merely by making a fine adjustment of parameters.

It is also possible to know the degree to which the elastic deformation of a polishing pad affects the measured data D22, by monitoring the correlation between the measured data after CMP process D22 and the height distribution data DP2 obtained based on the two-dimensional distribution image indicating only factors that can cause the phenomenon having a long correlation distance.

B. Second Preferred Embodiment

Following is a method for simulating a CMP process and a simulator for a CMP process according to a second preferred embodiment of the present invention. Similar reference numerals have been used in the following figures to denote similar parts that have the same configuration as in FIGS. 1 and 2, and need not be described herein.

B-1. Simulation Method and Simulator for CMP Process

Figure 7:
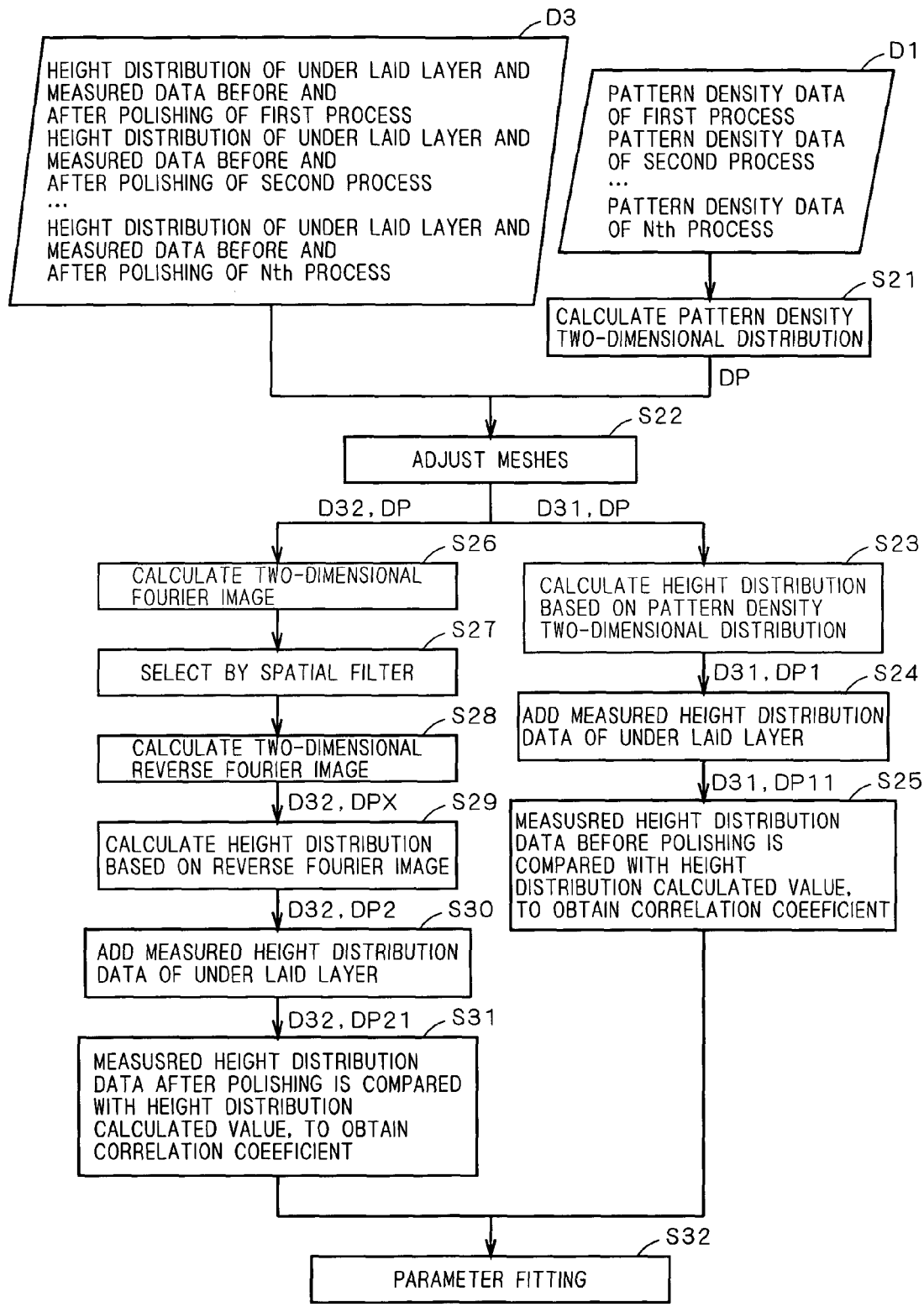
FIG. 7 is a flowchart to explain a method for simulating a CMP process according to a second preferred embodiment of the present invention.

A method for simulating a CMP process will be described by referring to the configuration of a simulator for a CMP process 2 shown in FIG. 8, and by using the flowchart shown in FIG. 7.

Figure 8:
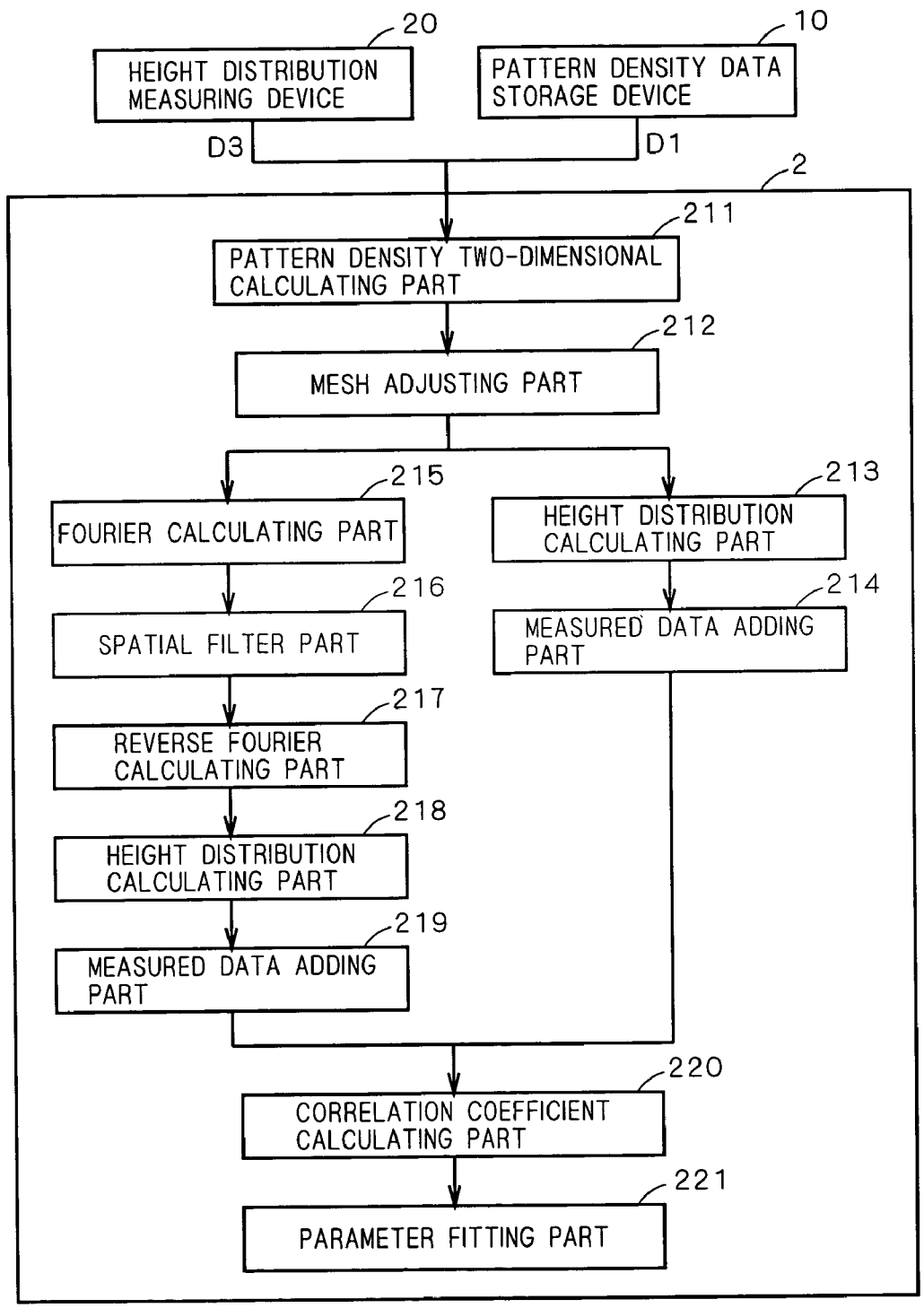
FIG. 8 a block diagram to explain the configuration of a simulator for a CMP process in the second preferred embodiment.

Referring to FIG. 8, the simulator 2 receives a pattern density data D1 per process from a pattern density data storage device 10, and receives a measured data D3 about a height distribution of an under laid layer and height distributions before and after CMP per process from a height distribution measuring device 20.

As used herein, the term "height distribution of the under laid layer" denotes the height distribution of the under laid layer of a fabrication pattern to be formed. Specifically, in the manufacturing processes of semiconductor devices, some processes such as selective etching and film formation are repeatedly performed with the use of about 30 types of masks. Accordingly, the semiconductor substrate surface before being subjected to a patterning can be assumed to be flat only at the time of its initial process. In the succeeding processes, some irregularities are already present on the semiconductor substrate surface before performing a patterning. Such irregularities on the semiconductor substrate are defined as a height distribution of an under laid layer.

In the simulator 2, based on a coordinate data contained in the pattern density data D1, a pattern density two-dimensional distribution calculating part 211 expands the pattern density data such that a mesh data is arrayed in two dimensions to obtain a two-dimensional image. This provides a two-dimensional distribution image DP per process (step S21).

In the measured data D3 about the height distribution of irregularities on the under laid layer and the height distributions of irregularities on the semiconductor device before and after performing a CMP process, which are provided from the height distribution measuring device 20, the condition of the irregularities on the semiconductor device is provided as a two-dimensional distribution image. However, the mesh of the pattern density two-dimensional distribution image DP is not always identical with that of the height distribution measured data D3. In order to adjust such that the two-dimensional distribution image DP and measured data D3 have the same mesh, a mesh adjusting part 212 makes a mesh adjustment (step S22).

Through the foregoing adjustment operation, the mesh of the pattern density two-dimensional distribution image DP matches the mesh of the height distribution measured data D3, and these two data can be compared to each other.

The mesh adjustment operation in the mesh adjusting part 212 is the same as that of the mesh adjusting part 112 shown in FIG. 2, and need not be described herein.

At the completion of the mesh adjustment in step S22, the resulting measured data before it is subjected to a CMP process (i.e., before polishing) is provided as a measured data D31 to a height distribution calculating part 213, together with the pattern density two-dimensional distribution image DP.

The measured data after CMP process (after polishing) is provided as a measured data D32 to a Fourier calculating part 215, together with the pattern density two-dimensional distribution image DP.

The height distribution calculating part 213 calculates a height distribution based on the pattern density two-dimensional distribution image DP, to obtain a height distribution data DP1 about a fabrication object surface before CMP process (step S23). The method for calculating the height distribution based on the pattern density two-dimensional distribution image DP is described previously with reference to FIGS. 5 and 6, and need not be described herein.

A measured data adding part 214 adds data of the height distribution of the under laid layer to the height distribution data DP1 about the fabrication object surface before CMP process, to obtain a height distribution data DP11 (step S24).

Following is the operation of parameter fitting before CMP process.

After step S24 acquires the height distribution data DP11 about the fabrication object surface before CMP process that contains the height distribution data about the under laid layer, the measured data before CMP process D31 and height distribution data DP11 are provided to a correlation coefficient calculating part 220.

The correlation coefficient calculating part 220 performs a least squares analysis of the measured data D21 and height distribution data DP1, to calculate a correlation coefficient (step S25). The analysis operation of step S25 is the same as that of step S4 shown in FIG. 1, and need not to be described herein.

Here, assuming that a film is formed on a semiconductor substrate (a fabrication object surface) having a certain pattern, the thickness of the formed film is a fitting parameter. The height distribution after forming this film on the semiconductor substrate is measured by the height distribution measuring device 20, and the measured result is measured data D31. The value calculated based on a pattern density data when forming this film is height distribution data DP11.

Therefore, the formation thickness d2 of a laminated film SFM that was set in step S23 is changed so as to approach the measured data D31, i.e., increase the correlation coefficient. This is one of the parameter fittings before CMP process.

Following is the operation of parameter fitting after CMP process.

The pattern density two-dimensional distribution image DP provided to the Fourier calculating part 215 is subjected to a Fourier transform (step S26) and then subjected to a spatial filter in a spatial filter part 216 (step S27). The resulting image is then subjected to a reverse Fourier transform in a reverse Fourier calculating part 217, to obtain a reverse Fourier image, i.e., a pattern density two-dimensional distribution image DPX in the real space (step S28).

The above-mentioned two-dimensional distribution image DPX and measured data after CMP process D32 are then provided to the height distribution calculating part 218. Based on the pattern density two-dimensional distribution image DPX, the calculation part 218 calculates a height distribution to obtain a height distribution data DP2 containing only factors that can cause the phenomenon having a long correlation distance (step S29).

The method for calculating the height distribution based on the pattern density two-dimensional distribution image DPX need not be described here because it is the same as the method for calculating the height distribution based on the pattern density two-dimensional distribution image DP, which is described previously with reference to FIGS. 5 and 6.

A measured data adding part 219 adds data of the height distribution of an under laid layer to the pattern density two-dimensional distribution image DPX, to obtain a height distribution data DP21 containing data of the height distribution of the under laid layer (step S30).

After step S30 acquires the height distribution data DP21, the data DP21 and measured data after CMP process D32 are provided to a correlation coefficient calculating part 220.

The correlation coefficient calculating part 220 performs a least squares analysis of the measured data D32 and height distribution data DP21, to calculate a correlation coefficient (step S31). The analysis operation of step S31 is the same as that of step S25.

Using the correlation coefficient obtained in step S31, as an index, a parameter fitting part 221 performs a parameter fitting such that the square of the correlation coefficient approaches the maximum (step S32).

Here, assuming that a film is formed on a semiconductor substrate (a fabrication object surface) having a certain pattern, the height distribution measuring device 20 measures a height distribution at the stage where this film is already polished by CMP. The measured result is measured data D32. On the other hand, a height distribution obtained based on the two-dimensional distribution image indicating only factors that can cause the phenomenon having a long correlation distance is height distribution data DP21.

Therefore, the formation thickness d2 of a laminated film SFM that was set in step S29 is changed so as to approach the measured data D32, i.e., increase the correlation coefficient. This is one of the parameter fittings after CMP process.

The foregoing operations in steps S21 to S32 are repeated with respect to measured data before and after CMP process in all the inputted manufacturing processes.

B-2. Effects

According to the method for simulating a CMP process and the simulator for a CMP process in the second preferred embodiment, before and after CMP process, a measured data and a simulation data are compared to obtain a correlation. Accordingly, the adjustment of parameters before CMP process can be separated clearly from the adjustment of parameters after CMP process, thus leading to the simulator that can consider various parameters.

This provides the characteristic feature that if process conditions are changed or a new apparatus is added, adjustment may be accomplished merely by making a fine adjustment of parameters.

In addition, with the configuration that the measured data of the height distribution of the under laid layer in the individual process is added to the pattern density data, it is possible to consider the influence of the previous process and therefore permit a simulation suitable for manufacturing semiconductor devices having a laminated structure.

C. Third Preferred Embodiment

Following is a method for simulating a CMP process and a simulator for a CMP process according to a third preferred embodiment of the present invention. Similar reference numerals have been used in the following figures to denote similar parts that have the same configuration as in FIGS. 1 and 2, and need not be described herein.

C-1. Simulation Method and Simulator for CMP Process

Figure 9:
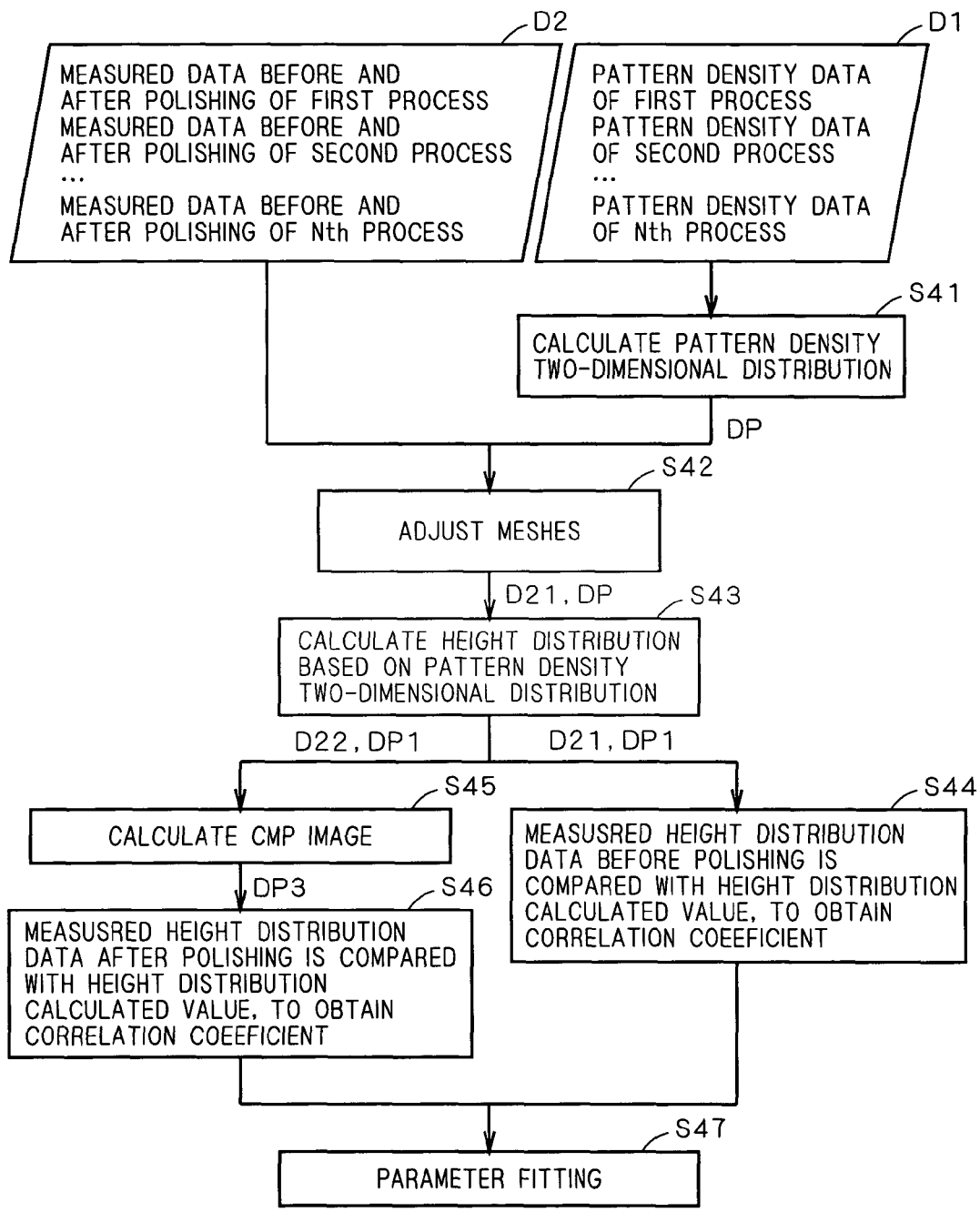
FIG. 9 is a flowchart to explain a method for simulating a CMP process according to a third preferred embodiment of the present invention.

A method for simulating a CMP process will be described by referring to the configuration of a simulator for a CMP process 3 shown in FIG. 10, and by using the flowchart shown in FIG. 9.

Figure 10:
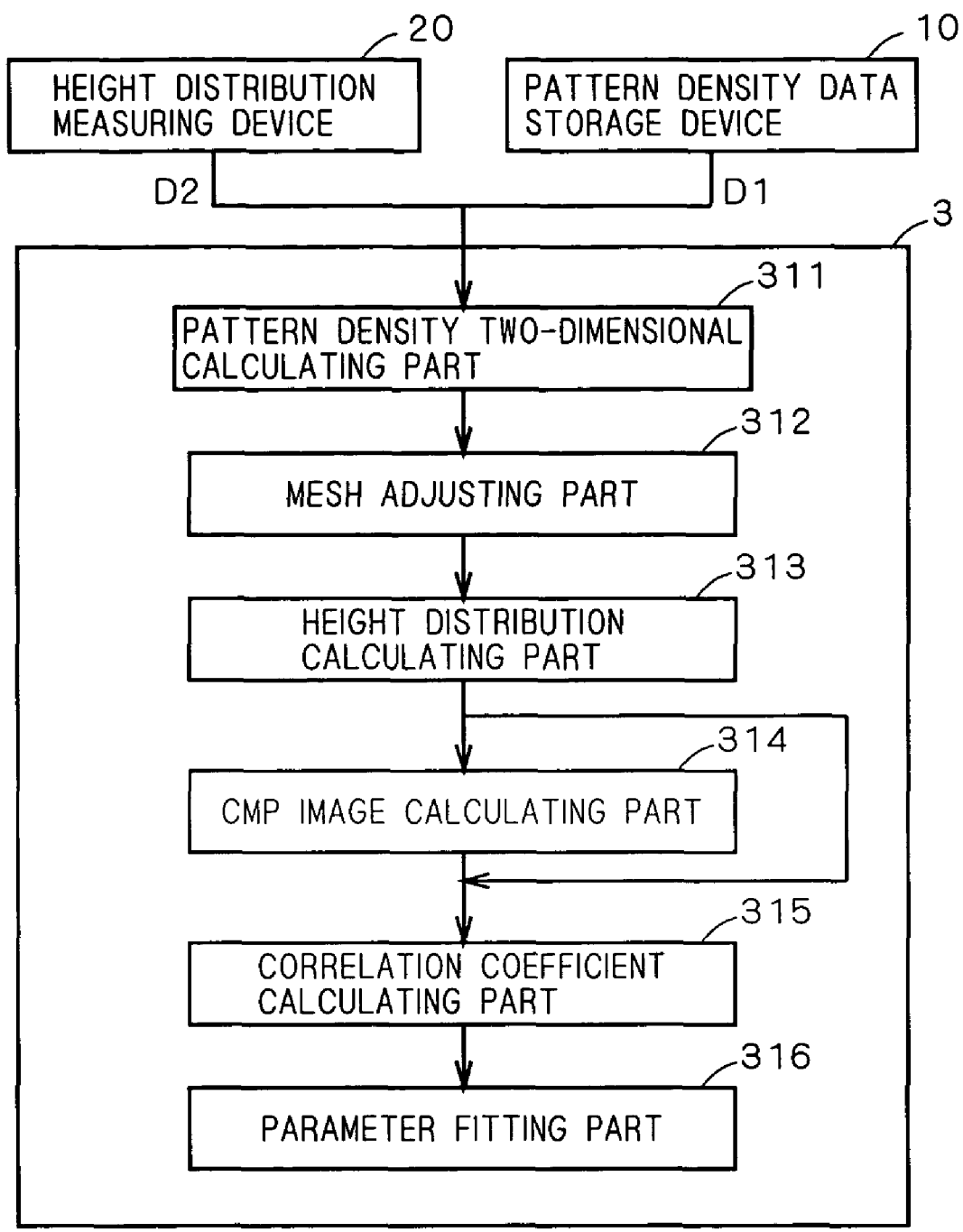
FIG. 10 is a block diagram to explain the configuration of a simulator for a CMP process in the third preferred embodiment.

Referring to FIG. 10, the simulator 3 receives a pattern density data D1 per process from a pattern density data storage device 10, and receives a measured data D2 about height distributions before and after CMP per process from a height distribution measuring device 20.

In the simulator 3, based on a coordinate data contained in the pattern density data D1, a pattern density two-dimensional distribution calculating part 311 expands the pattern density data such that a mesh data is arrayed in two dimensions to obtain a two-dimensional image. This provides a two-dimensional distribution image DP per process (step S41).

In the measured data D2 about the height distributions of irregularities on an under laid layer before and after performing a CMP process, which are provided from the height distribution measuring device 20, the condition of the irregularities on the semiconductor device is provided as a two-dimensional distribution image. However, the mesh of the pattern density two-dimensional distribution image DP is not always identical with that of the height distribution measured data D2. In order to adjust such that the two-dimensional distribution image DP and measured data D2 have the same mesh, a mesh adjusting part 312 makes a mesh adjustment (step S42).

The mesh adjustment operation in the mesh adjusting part 312 is the same as that of the mesh adjusting part 112 shown in FIG. 2, and need not be described herein.

Through the foregoing mesh adjustment operation, the mesh of the pattern density two-dimensional distribution image DP matches the mesh of the height distribution measured data D2, and these two data can be compared to each other.

At the completion of the mesh adjustment in step S42, the resulting measured data D21 before it is subjected to a CMP process (before polishing) and measured data after CMP process (after polishing) D22 are provided to a height distribution calculating part 313, together with the pattern density two-dimensional distribution image DP.

The height distribution calculating part 313 calculates a height distribution based on the pattern density two-dimensional distribution image DP, to obtain a height distribution data DP1 about a fabrication object surface before CMP process (step S43). The method for calculating the height distribution based on the pattern density two-dimensional distribution image DP is described previously with reference to FIGS. 5 and 6, and need not be described herein.

The height distribution data DP1 about the fabrication object surface before CMP process and measured data before CMP process D21 are provided to a correlation coefficient calculating part 315, and these data and the measured data after CMP process D22 are provided to a CMP image calculating part 314.

Following is the operation of parameter fitting before CMP process.

The correlation coefficient calculating part 315 performs a least squares analysis of the measured data D21 and height distribution data DP1, to calculate a correlation coefficient (step S44). The analysis operation of step S44 is the same as that of step S4 shown in FIG. 1, and need not to be described herein.

Subsequently in the parameter fitting part 316, the formation thickness d2 of a laminated film SFM that was set in step S43 is changed so as to approach the measured data D22, i.e., increase the correlation coefficient (step S47). This is one of the parameter fittings after CMP process.

Following is the operation of parameter fitting after CMP process.

The CMP image calculating part 314 calculates a two-dimensional distribution data after polishing that is obtained by CMP process, namely a CMP image, from the height distribution data DP1 about the fabrication object surface before CMP process, as well as mechanical parameters such as Young's modulus and elastic coefficients of a polishing pad used in the CMP process (step S45).

The operation of taking a CMP image will be described with reference to FIGS. 11 and 12.

Figure 11:
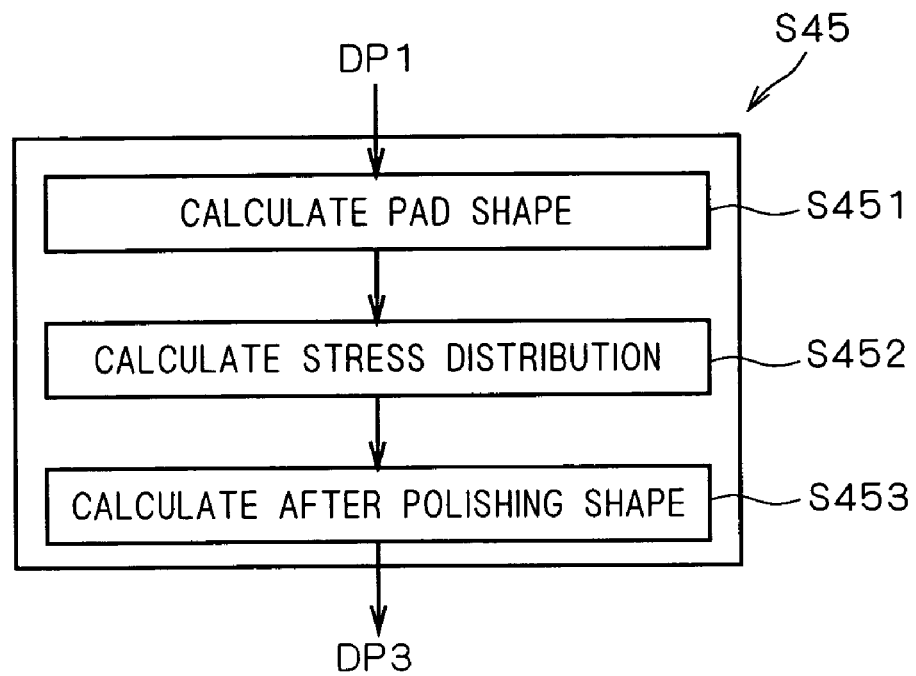
FIG. 11 is a flowchart to explain the operation of taking a CMP image.

Referring to FIG. 11, first, in step S451 the CMP image calculating part 314 calculates the shape of a polishing pad PAD when it is pressed against a fabrication object surface, based on the height distribution data DP1 about the fabrication object surface before CMP process.

Figure 12:
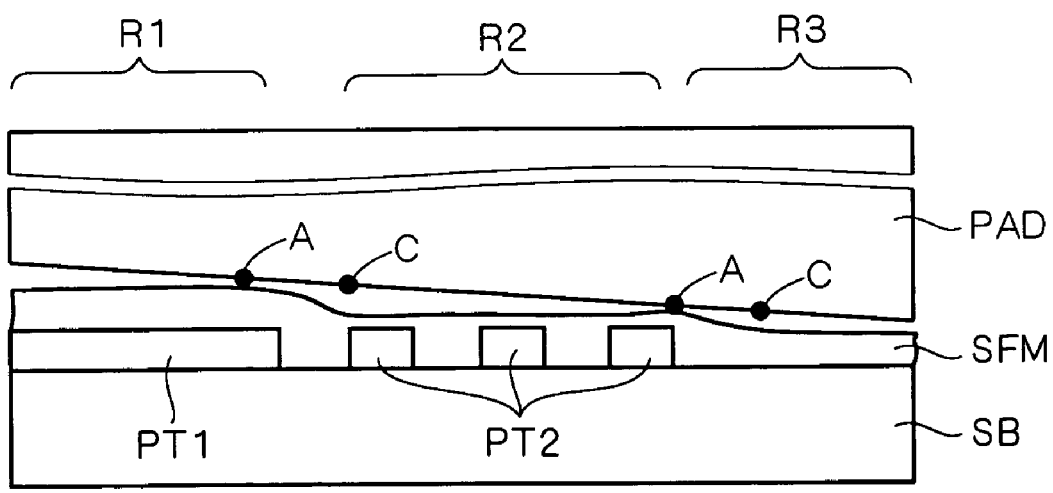
FIG. 12 is a diagram illustrating schematically the state that a polishing pad is pressed against a fabrication object surface before CMP.

FIG. 12 illustrates schematically the state that the polishing pad PAD is pressed against the fabrication object surface before CMP process. Similar reference numerals have been used in FIG. 12 to denote similar parts that have the same configuration as in FIG. 6, and need not be described herein.

Referring to FIG. 12, when the polishing pad PAD is pressed against the fabrication object surface, a characteristic phenomenon occurs at the boundary portions between regions R1 and R2 and that between regions R2 and R3. Specifically, the polishing pad PAD is brought into contact with the laminated film SFM at locations indicated by character "A" in these boundary portions, so that these locations are subjected to large stress and the laminated film SFM is well polished. On the other hand, at locations indicated by character "C", the polishing pad PAD is away from the laminated film SFM and these locations are subjected to less stress, resulting in poor polishing to the laminated film SFM.

The height distribution of the laminated film SFM before polishing, i.e., the shape of the laminated film SFM, is given by the product of a pattern density two-dimensional distribution and thickness d2 of a circuit pattern PT1 or PT2. The two-dimensional distribution image of the polishing pad PAD is obtainable by the product of a reverse Fourier image and thickness d2.

Returning to FIG. 11, after calculating the two-dimensional distribution image of the irregularities of the polishing pad (i.e., the pad shape), a two-dimensional distribution of stress exerted on the polishing pad is calculated (step S452).

The stress exerted on the polishing pad PAD will be described with reference to FIG. 12.

Referring to FIG. 12, when the polishing pad PAD is pressed against the fabrication object surface, the polishing pad PAD is brought into contact with the laminated film SFM at locations indicated by character "A" in these boundary portions, whereas at locations indicated by character "C" are subjected to less stress, resulting in poor polishing to the laminated film SFM.

Specifically, since large stress is being exerted on the regions, such as regions R1 and R2, where the change amount of the polishing pad PAD is large, these regions are polished promptly. In contrast, in the region free from any distortion such as region R3, and in the case that distortion occurs in the region between projected patterns, the stress is zero, making it difficult to polish these regions. Even projected patterns of the same size will be subjected to different stresses and different polish velocities, depending on whether there is any other projected pattern that supports adjacent to these projected patterns.

In step S452, such stress that varies depending on the location of the polishing pad PAD is calculated to obtain a two-dimensional distribution image of the stress.

The two-dimensional distribution image of the stress exerted on the polishing pad PAD can be found from a difference between the shape of the laminated film SFM and the shape of the polishing pad PAD (i.e., the two-dimensional image of the irregularities).

That is, the two-dimensional distribution image of the stress exerted on the polishing pad PAD is obtainable by multiplying a numeric value, which is obtained by subtracting the numeric data of the shape of the polishing pad PAD from the numeric data of the shape of the laminated film SFM, by Young's modulus (elastic coefficients).

In step S453, a two-dimensional data DP3 about the irregularities on the fabrication object surface after polishing is calculated based on the two-dimensional distribution image of the stress on the polishing pad PAD.

The height of the fabrication object surface after polishing can be obtained as follows. First, a polishing amount (Å) of a calculation object area is obtained by multiplying the following items: (i) a polishing rate (Å/sec) that is determined by the material of the fabrication object surface, the material of the polishing pad and the number of revolutions of the polishing pad, etc.; (ii) a stress value (pascal) exerted on the polishing pad in the calculation object area; and (iii) a polishing time (sec). Next, the obtained polishing amount is subtracted from the height of the calculation object area of the fabrication object surface before polishing.

Since in step S453 the area subjected to the highest stress, namely, the uppermost projecting area on the fabrication object surface, is large in polishing rate, it is possible to express the situation that the substrate is being planarized. This provides a two-dimensional distribution data DP3 of the irregularities on the fabrication object surface after polishing.

Returning to FIGS. 9 and 10, the two-dimensional distribution data DP3 and measured data after CMP process D22 are provided to the correlation coefficient calculating part 315.

The correlation coefficient calculating part 315 performs a least squares analysis of the measured data D22 and two-dimensional data DP3, to calculate a correlation coefficient (step S46). The analysis operation of step S46 is the same as that of step S4 described with reference to FIG. 1, and need not be described herein.

Using the correlation coefficient obtained in step S46, as an index, the parameter fitting part 316 performs a parameter fitting such that the square of the correlation coefficient approaches the maximum (step S47).

Here, assuming that a film is formed on a semiconductor substrate (a fabrication object surface) having a certain pattern, the height distribution measuring device 20 measures a height distribution at the stage where this film is already polished by CMP. The measured result is measured data D22. On the other hand, the calculated two-dimensional distribution data of the irregularities on the fabrication object surface after CMP process is two-dimensional distribution data DP3.

Therefore, for example, the polishing rate (Å/sec) that is determined by the material of the polishing pad, the number of revolutions of the polishing pad and the like, the stress value (pascal) exerted on the polishing pad in the calculation object area, and the polishing time (sec), which were set in step S453, are changed so as to approach the measured data D22, i.e., increase the correlation coefficient. This is one of the parameter fittings after CMP process.

C-2. Effects

According to the method for simulating a CMP process and the simulator for a CMP process in the third preferred embodiment, before and after CMP process, a measured data and a simulation data are compared to obtain a correlation. Accordingly, the adjustment of parameters before CMP process can be separated clearly from the adjustment of parameters after CMP process, thus leading to the simulator that can consider various parameters.

This provides the characteristic feature that if process conditions are changed or a new apparatus is added, adjustment may be accomplished merely by making a fine adjustment of parameters.

In addition, various parameters such as the polishing rate, stress value exerted on the polishing pad and polishing time that are used for the calculation about polishing can be inspected by monitoring the correlation between the measured data after CMP process D22 and the calculated two-dimensional distribution data DP3 about the irregularities on the fabrication object surface after CMP process.

D. Fourth Preferred Embodiment

Following is a method for simulating a CMP process and a simulator for a CMP process according to a fourth preferred embodiment of the present invention. Similar reference numerals have been used in the following figures to denote similar parts that have the same configuration as that shown in FIGS. 1 and 2, and need not be described herein.

D-1. Simulation Method and Simulator for CMP Process

Figure 13:
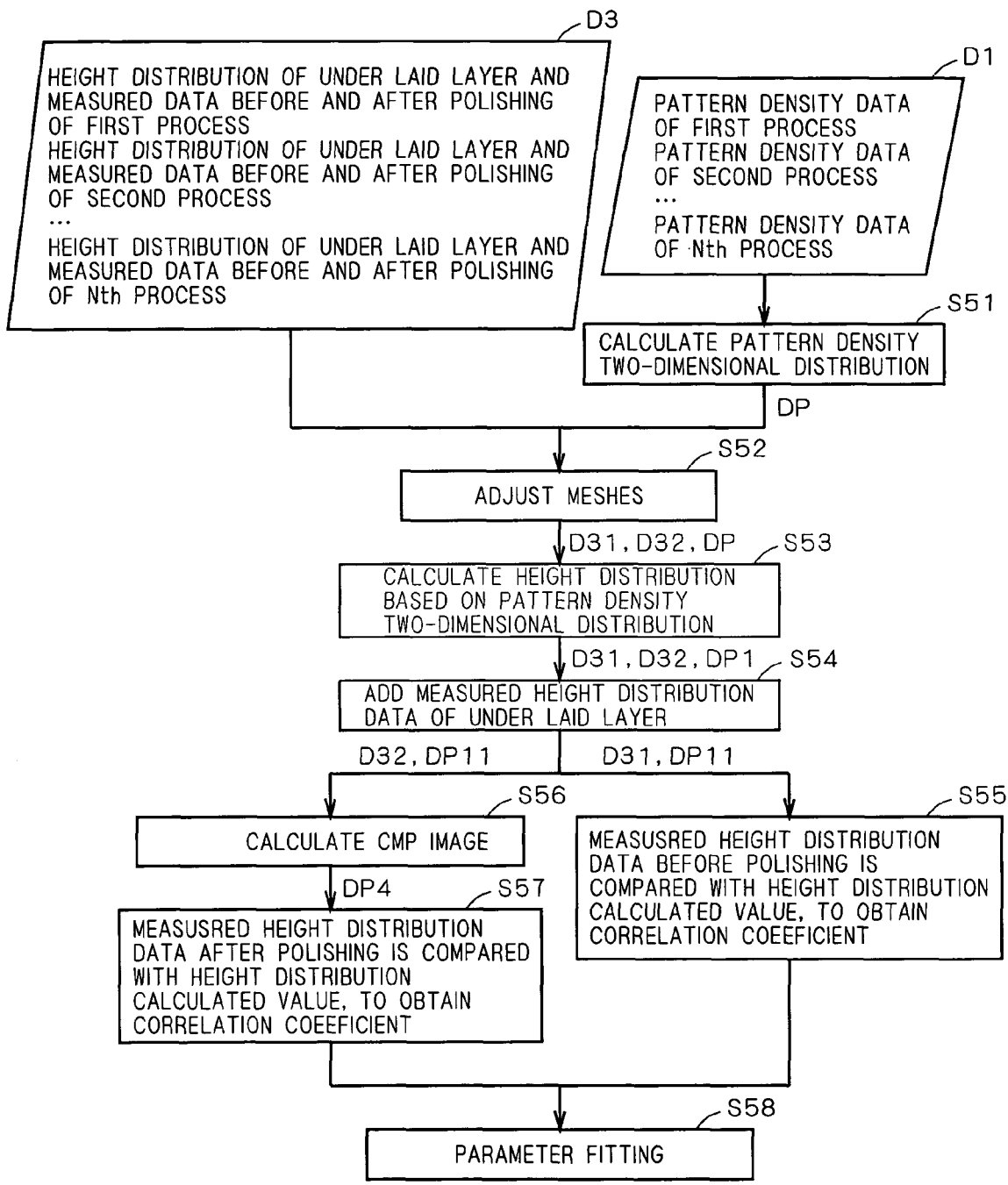
FIG. 13 is a flowchart to explain a method for simulating a CMP process according to a fourth preferred embodiment of the present invention.

A method for simulating a CMP process will be described by referring to the configuration of a simulator for a CMP process 4 shown in FIG. 14, and by using the flowchart shown in FIG. 13.

Figure 14:
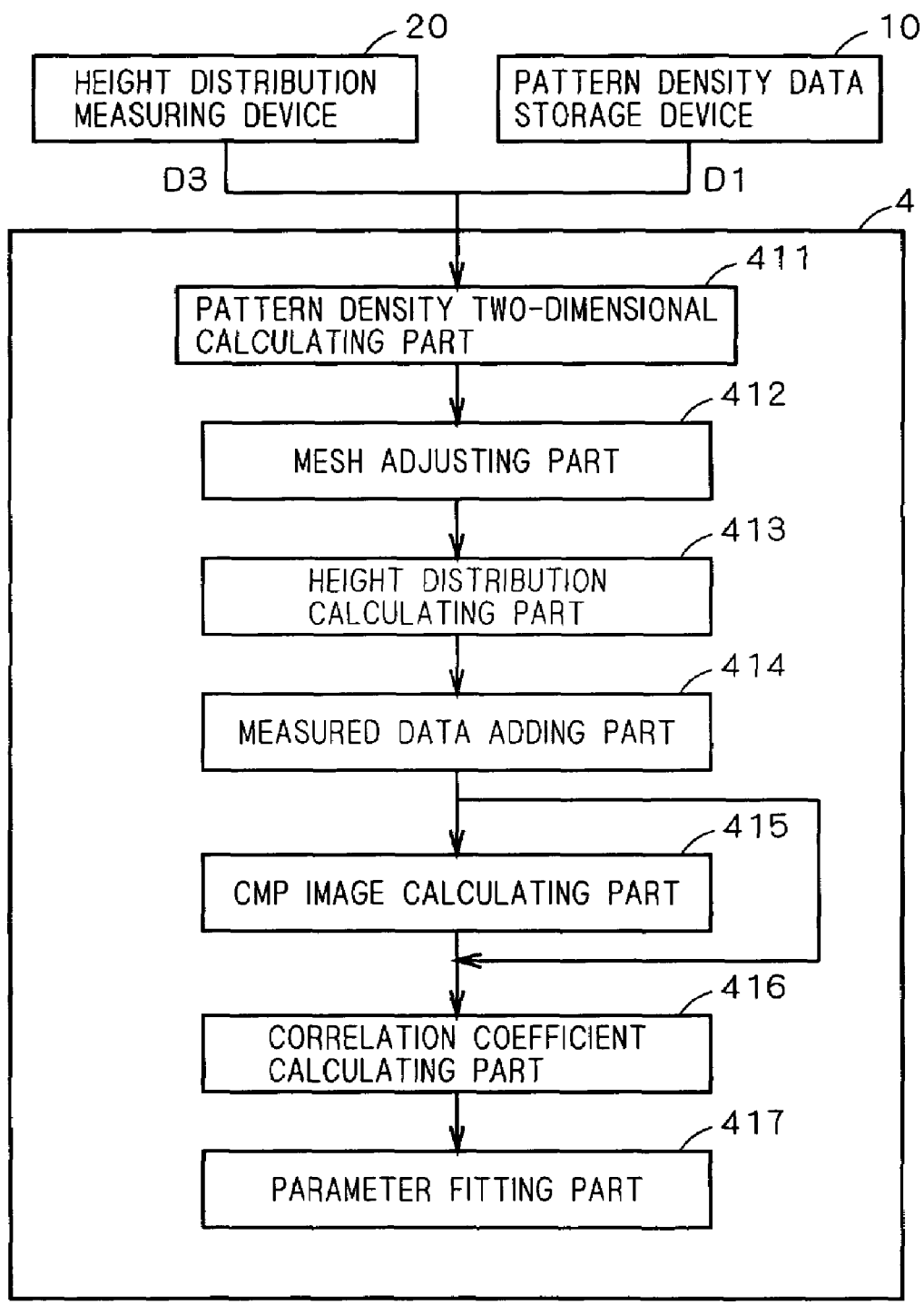
FIG. 14 is a block diagram to explain the configuration of a simulator for a CMP process in the fourth preferred embodiment.

Referring to FIG. 14, the simulator 4 receives a pattern density data D1 per process from a pattern density data storage device 10, and receives a measured data D3 about a height distribution of an under laid layer and height distributions before and after CMP per process from a height distribution measuring device 20.

Based on a coordinate data contained in the pattern density data D1, a pattern density two-dimensional distribution calculating part 411 expands the pattern density data such that a mesh data is arrayed in two dimensions to obtain a two-dimensional image. This provides a two-dimensional distribution image DP per process (step S51).

In the measured data D3 about the height distribution of the irregularities on the under laid layer and the height distributions of the irregularities on the semiconductor device before and after performing a CMP process, which are provided from the height distribution measuring device 20, the condition of the irregularities on the semiconductor device is provided as a two-dimensional distribution image. However, the mesh of the pattern density two-dimensional distribution image DP is not always identical with that of the height distribution measured data D3. In order to adjust such that the two-dimensional distribution image DP and measured data D3 have the same mesh, a mesh adjusting part 412 makes a mesh adjustment (step S52).

Through the foregoing mesh adjustment operation, the mesh of the pattern density two-dimensional distribution image DP matches the mesh of the height distribution measured data D3, and these two data can be compared to each other.

The mesh adjustment operation in the mesh adjusting part 412 is the same as that of the mesh adjusting part 112 shown in FIG. 2, and need not be described herein.

At the completion of the mesh adjustment in step S52, the resulting measured data D31 before it is subjected to a CMP process (before polishing), the measured data after CMP process (after polishing) D32 and the pattern density two-dimensional distribution image DP are provided to a height distribution calculating part 413.

The height distribution calculating part 413 calculates a height distribution based on the pattern density two-dimensional distribution image DP, to obtain a height distribution data DP1 about the fabrication object surface before CMP process (step S53). The method for calculating the height distribution based on the pattern density two-dimensional distribution image DP is described previously with reference to FIGS. 5 and 6, and need not be described herein.

Subsequently, a measured data calculating part 414 adds data of a height distribution of an under laid layer to the height distribution data DP1 about the fabrication object surface before CMP process, to obtain a height distribution data DP11 containing the height distribution data of the under laid layer (step S54).

The height distribution data DP11 and measured data before CMP process D31 are provided to a correlation coefficient calculating part 416, and these data and the measured data after CMP process D32 are provided to a CMP image calculating part 415.

Following is the operation of parameter fitting before CMP process.

The correlation coefficient calculating part 416 performs a least squares analysis of the measured data D31 before CMP process and height distribution data DP11, to calculate a correlation coefficient (step S55). The analysis operation of step S55 is the same as that of step S4 shown in FIG. 1, and need not to be described herein.

Here, assuming that a film is formed on a semiconductor substrate (a fabrication object surface) having a certain pattern, the thickness of the formed film is a fitting parameter. The height distribution measuring device 20 measures a height distribution at the stage where this film is formed on the semiconductor substrate. The measured result is measured data D31. On the other hand, the calculated value based on a pattern density data when forming this film is height distribution data DP11.

Therefore, in a parameter fitting part 417 the formation thickness d2 of a laminated film SFM that was set in step S53 is changed so as to approach the measured data D31, i.e., increase the correlation coefficient (step S58). This is one of the parameter fittings before CMP process.

Following is the operation of parameter fitting after CMP process.

The CMP image calculating part 415 calculates a two-dimensional distribution data after polishing DP4 that is obtained by CMP process, from the height distribution data DP11 about the fabrication object surface before CMP process that contains the height distribution data of the under laid layer, as well as mechanical parameters such as Young's modulus and elastic coefficients of a polishing pad used in the CMP process (step S56). The operation of taking a CMP image in step S56 is the same as that described with reference to FIGS. 11 and 12, and need not be described herein.

The two-dimensional distribution data DP4 and measured data after CMP process D32 are then provided to the correlation coefficient calculating part 416.

The correlation coefficient calculating part 416 performs a least squares analysis of the measured data D32 and two-dimensional distribution data DP4, to calculate a correlation coefficient (step S57). The analysis operation of step S57 is the same as that of step S4, and need not to be described herein.

Using the correlation coefficient obtained in step S57, as an index, the parameter fitting part 417 performs a parameter fitting such that the square of the correlation coefficient approaches the maximum (step S58).

Here, assuming that a film is formed on a semiconductor substrate (a fabrication object surface) having a certain pattern, the height distribution measuring device 20 measures a height distribution at the stage where this film is already polished by CMP. The measured result is measured data D32. On the other hand, the calculated two-dimensional distribution data of the irregularities on the fabrication object surface after CMP process is two-dimensional distribution data DP4.

Therefore, for example, some parameters such as the polishing rate (Å/sec) that is determined by the material of the polishing pad, the number of revolutions of the polishing pad, and the like, the stress value (pascal) exerted on the polishing pad in the calculation object area, and the polishing time (sec), which were set in step S453 (FIG. 11), are changed so as to approach the measured data D32, i.e., increase the correlation coefficient. This is one of the parameter fittings after CMP process.

D-2. Effects

According to the method for simulating a CMP process and the simulator for a CMP process in the fourth preferred embodiment, before and after CMP process, a measured data and a simulation data are compared to obtain a correlation. Accordingly, the adjustment of parameters before CMP process can be separated clearly from the adjustment of parameters after CMP process, thus leading to the simulator that can consider various parameters.

This provides the characteristic feature that if process conditions are changed or a new apparatus is added, adjustment may be accomplished merely by making a fine adjustment of parameters.

In addition, various parameters such as the polishing rate, stress value exerted on the polishing pad and polishing time that are used for the calculation about polishing can be inspected by monitoring the correlation between the measured data after CMP process D22 and the calculated two-dimensional distribution data DP3 about the irregularities on the fabrication object surface after CMP process.

Furthermore, with the configuration that the measured data of the height distribution of the under laid layer in the individual process is added to the pattern density data, it is possible to consider the influence of the previous process and therefore permit a simulation suitable for manufacturing semiconductor devices having a laminated structure.

While the invention has been shown and described in detail, the foregoing description is in all aspects illustrative and not restrictive. It is therefore understood that numerous modifications and variations can be devised without departing from the scope of the invention.

What is claimed is:

1. A method of simulating a chemical mechanical polishing process, said method comprising:

obtaining a first dataset, which includes two-dimensional pattern density distribution data derived from expanding pattern density data in two dimensions based on coordinate data, and outputting said first dataset as a two-dimensional pattern density distribution image;

obtaining a second dataset which includes two-dimensional height distribution data derived from multiplying said first dataset and a first measured thickness of a laminated film laminated on a semiconductor substrate;

obtaining a third dataset which includes two-dimensional Fourier transformation data derived from Fourier-transforming said first dataset;

obtaining a fourth dataset which includes said two-dimensional Fourier transformation data of said third dataset spatial-filtered such that only a component having a predetermined spatial frequency passes through;

obtaining a fifth dataset which includes two-dimensional reverse Fourier transformation data derived from reverse Fourier-transforming said fourth dataset;

obtaining a sixth dataset which includes two-dimensional height distribution data derived from multiplying said fifth dataset and a second measured thickness of said laminated film laminated on said semiconductor substrate; and simulating said chemical mechanical polishing process by performing a least squares analysis to obtain a first correlation coefficient indicating a degree of correlation between said second dataset and said first measured thickness of said laminated film, and adjusting said first correlation coefficient to cause said second dataset to match said first measured thickness of said laminated film; and simulating said chemical mechanical polishing process by performing a least squares analysis to obtain a second correlation coefficient indicating a degree of correlation between said sixth dataset and said second measured thickness of said laminated film, and adjusting said second correlation coefficient to cause said sixth dataset to match said second measured thickness of said laminated film.

2. The method according to claim 1, comprising:

obtaining a first calculated dataset which includes two-dimensional pattern density data containing information about a pattern density per unit region of a fabrication pattern in a pattern forming process of a semiconductor device;

obtaining a first measured dataset which includes two-dimensional height distributions on said semiconductor substrate that are measured before a chemical mechanical polishing process is executed with respect to said pattern forming process;

obtaining a second measured dataset which includes two-dimensional height distributions on said semiconductor substrate that are measured after a chemical mechanical polishing process is executed with respect to said pattern forming process;

comparing said first measured dataset with first calculated data about a two-dimensional distribution of a topography on said semiconductor substrate before said chemical mechanical polishing process is executed, said first calculated data being calculated from said pattern density data;

obtaining a first correlation coefficient, which is derived by a least squares analysis, and performing a parameter fitting such that a square of said first correlation coefficient becomes a maximum;

comparing said second measured dataset with second calculation data about a two-dimensional distribution of a topography on said semiconductor substrate after said chemical mechanical polishing process is executed, said second calculation data being from said pattern density data; and obtaining a second correlation coefficient, which is derived by a least squares analysis, and performing a parameter fitting such that a square of said second correlation coefficient becomes a maximum.

3. The method according to claim 2, further comprising:

adjusting sampling meshes of said first and second measured data so as to match a mesh of said pattern density two-dimensional distribution image.

4. The method according to claim 2, further comprising:

obtaining third measured data about a height distribution of a topography of an under laid layer of said fabrication pattern which is measured before forming said fabrication pattern; and adding said third measured data to said first and second calculated data, respectively.

5. The method according to claim 4, further comprising:

adjusting sampling meshes of said first, second and third measured data so as to match a mesh of said pattern density two-dimensional distribution image.

6. The method according to claim 1, comprising:

calculating a two-dimensional pattern density distribution by expanding said pattern density data in two dimensions based on said coordinate data, and outputting said expanded pattern density data as said pattern density two-dimensional distribution image;

calculating a height distribution that obtains first calculated data by executing an operation of multiplying a pattern density at individual parts of said pattern density two-dimensional image by a thickness of a laminated film laminated on said pattern density two-dimensional distribution image; and obtaining second calculated data by
  (i) calculating, based on said first calculated data, a two-dimensional distribution image of a polishing pad in a state that said polishing pad used in said chemical mechanical polishing process of said laminated film is pressed against said laminated film,
  (ii) calculating a two-dimensional distribution image of stress exerted on said polishing pad based on said two-dimensional distribution image of said polishing pad, and
  (iii) calculating a two-dimensional distribution image of irregularities after polishing said laminated film based on said two-dimensional distribution of said stress.

7. The method according to claim 6, further comprising:

receiving third measured data about a height distribution of a topography of an under laid layer of said fabrication pattern which is measured before forming said fabrication pattern; and adding said third measured data to said first calculated data.

8. The method according to claim 6, further comprising:

adjusting sampling meshes of said first and second measured datasets so as to match a mesh of said pattern density two-dimensional distribution image.

9. The method according to claim 7, further comprising:

adjusting sampling meshes of said first, second and third measured data so as to match said mesh of said pattern density two-dimensional distribution image.

* * * * *